(12) United States Patent
Finke et al.

(10) Patent No.: US 12,481,767 B2
(45) Date of Patent: Nov. 25, 2025

(54) SYSTEMS AND METHODS FOR ASSESSING SECURITY IN A COMPUTING DEVICE ENVIRONMENT

(71) Applicant: OnDefend Holdings, LLC, Jacksonville, FL (US)

(72) Inventors: Benjamin Finke, St Johns, FL (US); Christopher Freedman, Ponte Vedra Beach, FL (US)

(*) Notice: Subject to any disclaimer, the term of this patent is extended or adjusted under 35 U.S.C. 154(b) by 0 days.

(21) Appl. No.: 18/545,955

(22) Filed: Dec. 19, 2023

(65) Prior Publication Data

US 2024/0220635 A1    Jul. 4, 2024

Related U.S. Application Data

(63) Continuation of application No. 18/092,220, filed on Dec. 31, 2022, now abandoned.

(51) Int. Cl.
*G06F 21/57* (2013.01)
*G06F 21/53* (2013.01)

(52) U.S. Cl.
CPC ............ *G06F 21/577* (2013.01); *G06F 21/53* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 10,812,516 B2* | 10/2020 | Chenette | H04L 63/1433 |
| 12,306,959 B2* | 5/2025 | Agarwwal | H04L 41/145 |
| 2014/0082737 A1* | 3/2014 | Beskrovny | H04L 63/1433 726/25 |
| 2018/0219909 A1* | 8/2018 | Gorodissky | H04L 43/50 |
| 2021/0037040 A1* | 2/2021 | Aleks | H04L 63/1433 |
| 2021/0042207 A1* | 2/2021 | Joyce | G06F 11/3612 |
| 2022/0019674 A1* | 1/2022 | Frey | H04L 63/14 |
| 2022/0067171 A1* | 3/2022 | Nakanishi | G06F 21/577 |
| 2023/0336581 A1* | 10/2023 | Dunn | G06F 21/577 |

* cited by examiner

*Primary Examiner* — Fatoumata Traore
(74) *Attorney, Agent, or Firm* — Wilson Dutra, PLLC; Camille A. Wilson

(57) ABSTRACT

The present disclosure provides for systems and methods for assessing security in a computing environment. The system may comprise two or more attacks simultaneously. The system may comprise one or more attack simulations wherein the results are displayed in substantially real time. The system may comprise one or more performance indicators. The performance indicators may provide insight into what attacks are blocked, detected, logged, or alerted. The system may comprise one or more prioritized recommendations for security solutions, which may comprise one or more tool recommendations. The attack path may comprise an aggregation of one or more attack techniques. The system may comprise one or more endpoint solutions or recommendations. The system may integrate as a third-party software into an existing company or security infrastructure. The system may comprise at least one security validation test configured to target at least one security infrastructure of a scoped computing environment.

18 Claims, 12 Drawing Sheets

1100

```
┌─────────────────────────────────────────────────────────────┐
│ INTEGRATE AT LEAST ONE SECURITY ASSESSMENT SYSTEM WITH AT   │
│ LEAST ONE SCOPED COMPUTING ENVIRONMENT                      │
│                                                        1105 │
└─────────────────────────────────────────────────────────────┘
                              │
┌─────────────────────────────────────────────────────────────┐
│ INITIATE AT LEAST ONE SECURITY VALIDATION TEST WITHIN THE   │
│ SCOPED COMPUTING ENVIRONMENT                                │
│                                                        1110 │
└─────────────────────────────────────────────────────────────┘
                              │
┌─────────────────────────────────────────────────────────────┐
│ DETERMINE WHETHER ONE OR MORE ASPECTS OF THE SECURITY       │
│ VALIDATION TEST WERE DETECTED                               │
│                                                        1115 │
└─────────────────────────────────────────────────────────────┘
                              │
┌─────────────────────────────────────────────────────────────┐
│ DETERMINE WHETHER ONE OR MORE NOTIFICATIONS WERE            │
│ GENERATED                                                   │
│                                                        1120 │
└─────────────────────────────────────────────────────────────┘
                              │
┌─────────────────────────────────────────────────────────────┐
│ DETERMINE WHETHER AT LEAST ONE REMEDIAL MEASURE WAS         │
│ IMPLEMENTED                                                 │
│                                                        1125 │
└─────────────────────────────────────────────────────────────┘
                              │
┌─────────────────────────────────────────────────────────────┐
│ DETERMINE AT LEAST ONE TIME LAPSE INTERVAL                  │
│                                                        1130 │
└─────────────────────────────────────────────────────────────┘
                              │
┌─────────────────────────────────────────────────────────────┐
│ PRESENT ONE OR MORE SECURITY VALIDATION TEST RESULTS TO AT  │
│ LEAST ONE USER                                              │
│                                                        1135 │
└─────────────────────────────────────────────────────────────┘
```

FIG. 11

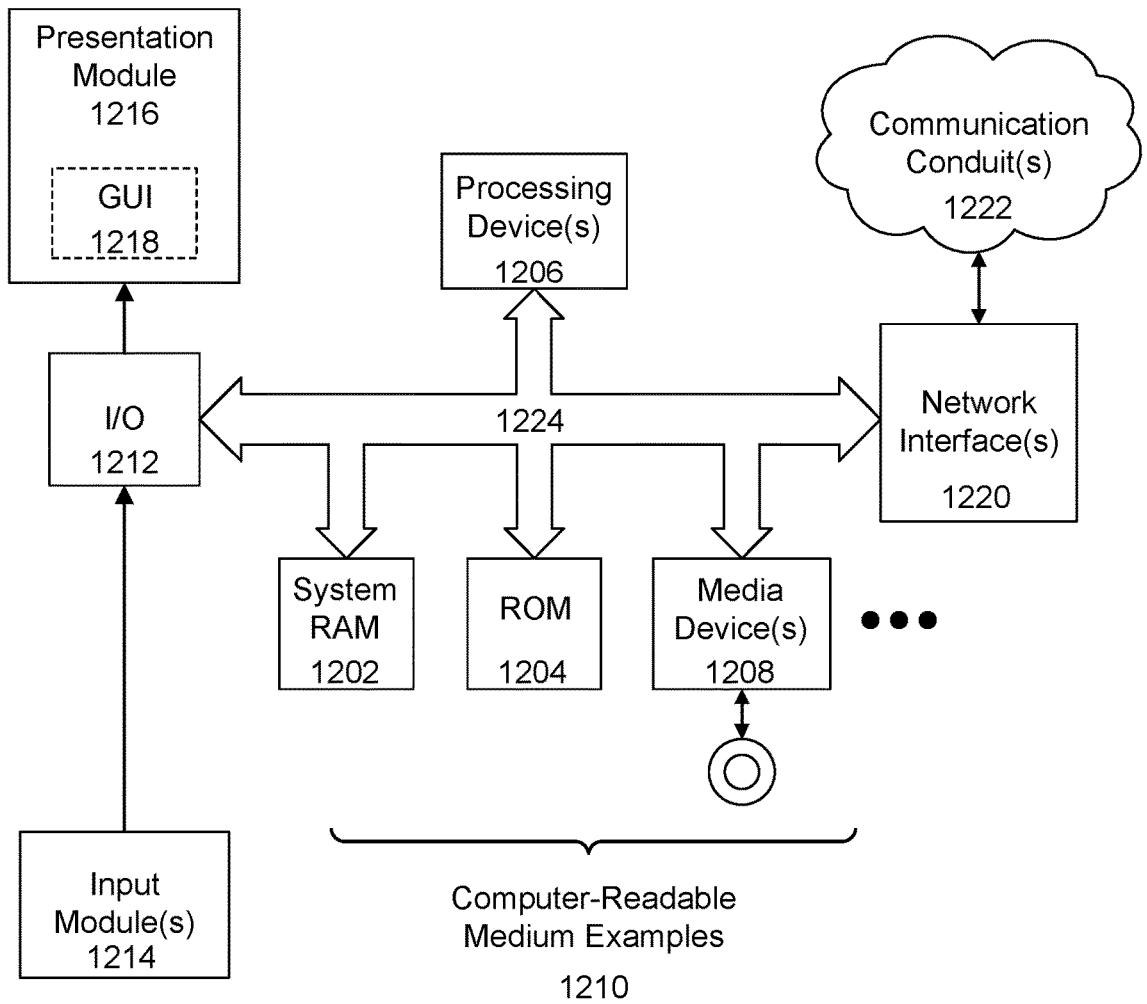
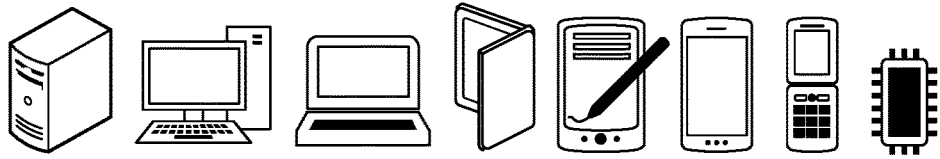
FIG. 12

SYSTEMS AND METHODS FOR ASSESSING SECURITY IN A COMPUTING DEVICE ENVIRONMENT

CROSS-REFERENCE TO RELATED APPLICATION

This application claims priority to and the full benefit of U.S. Nonprovisional patent application Ser. No. 18/092,220 (filed Dec. 31, 2022, and titled "SYSTEMS AND METHODS FOR ASSESSING SECURITY IN A COMPUTING DEVICE ENVIRONMENT"), the entire contents of which are incorporated in this application by reference.

BACKGROUND

Within every industry there is some required level of computer security. Whether a corporation needs to protect something as simple as financial transactions or they sell software products that need increased security to protect against cyber attacks, the need to protect private information is pervasive.

Many companies have attempted to address this issue by hiring one or more people specifically trained in informational security. These security providers may work as a contractor of a larger security company, or they might be employees hired by the primary company to manage their security needs. These people are sometimes called a defensive or blue team for the purpose they serve in creating software and protocols that defend the company's infrastructure, including, but not limited to, a company's information and operational technology (IT/OT), internet of things (IoT), or cloud computing environment.

Security and control gaps constitute problems for 90% of companies; most companies, or their managed security service providers (MSSPs), have deployed detection and alerting tools, such as endpoint detection and response tools within a Security Operations Center (SOC) or Security Event and Incident Management (SEIM) products and services, to block or alert their teams to cyber-attack techniques and activities; however, they haven't implemented any technology-driven automated means for testing or validating the performance of these detection and alerting tools. While some security providers may create custom software for a host company, the customized software often has limited compatibility with external software packages that might bolster security. Additionally, some security providers may attempt to validate tool performance manually; however, such manual processes are cumbersome and difficult to scale due to their dependency on human activity.

Sometimes, security providers or companies may purchase and install a security package software that may comprise a protective security framework and some attack simulations to test the integrity of the installed security framework. In some instances, security providers or companies may purchase other attack software to simulate other attacks to further test the company's security framework. In the present market, there are many breach and attack simulation solutions, but nothing that views the challenges wholistically; the simulations provide feedback, but without a specific purpose and target, the feedback data is fragmented and has minimal utility. Furthermore, because the imported attack software and the company's existing security infrastructure are not always built by the same development team, there is often a large gap between simulated attack and breach activities and the solutions that may be implemented by the company's software.

The attack and breach software that does contain some form of feedback often uses a closed feedback loop to use data collected from a simulated attack constructively, but the information remains siloed. Available attack packages, by nature of being in a competitive market, remain siloed in their results by not being configured to interface with other attack and breach software by other developers, or any other type of attack activity. Additionally, while attack and breach software is often configured to identify new data sources within a security framework from which the framework's detection and alerting tools may not be receiving any telemetry to generate new detection and alerting rules, a process does not exist to regularly test the new rules to confirm they are functioning correctly in real time during an uptime of the security framework.

This process, often conducted in a coordinated effort, is called a purple team effort. The process of coordinating the defense efforts of the blue team with the feedback provided by a "red team" attack software or penetration team (which simulates security attacks) is costly and time-consuming. Facilitating the implementation of the results from this timely process proves equally challenging as communication between the two parties remains a constant need.

SUMMARY OF THE DISCLOSURE

What is needed are systems and methods for assessing security in a computing environment that can make security tools and attack software available agnostically, create connectivity between blue teams and red teams, and provide wholistic feedback for a company's security infrastructure with prioritized solutions, including but not limited to, a company's information and operational technology (IT/OT), internet of things (IOT), or cloud computing environment.

The present disclosure provides for systems and methods for assessing security in a computing environment. In some embodiments, the system may comprise at least one attack. In some implementations, the system may comprise two or more attacks simultaneously. In some aspects, the system may comprise one or more attack simulations wherein the results may be displayed in substantially real time.

In some embodiments, the system may comprise at least one report. In some implementations, the report may comprise one or more scores. In some aspects, the system may comprise one or more performance indicators. In some embodiments, the performance indicators may provide insight into what attacks are blocked, detected, logged, and alerted. In some implementations, the system may comprise one or more tools. In some aspects, the system may comprise prioritized recommendations for security solutions, which may comprise one or more tool recommendations. In some embodiments, the system may comprise at least one attack path. In some aspects, the attack path may comprise an aggregation of attack techniques. In some implementations, the system may comprise at least one endpoint. In some embodiments, the system may comprise one or more endpoint solutions or recommendations. In some aspects, the system may integrate as a third-party software into an existing company or security infrastructure including but not limited to, a company's information and operational technology (IT/OT), internet of things (IOT), or cloud computing environment.

In some implementations, the system of the present disclosure may be configured to provide a method for alert validation. In some aspects, the system of the present disclosure may execute an alert validation test in a scoped environment. In some non-limiting exemplary embodiments, a system for assessing security in a computing environment may be configured to report whether an alert validation test is successful. In some aspects, an alert validation test may be successful when the scoped environment notifies and logs the presence of the alert validation test within an acceptable timeframe, wherein an acceptable timeframe may be at least partially defined by a company's compliance policy.

In some implementation, the system of the present disclosure may be configured to compare the functionality of security tools to one or more predefined defense standards. As a non-limiting example, a system for assessing security in a computing environment may be configured to test one or more security tools and compare the test results to those of other security tools, and score the tested security tools based on the test results. In some aspects, the system for assessing security in a computing environment may provide guidance to a company, organization, or other entity about the potential efficacy of one or more security tools.

BRIEF DESCRIPTION OF THE DRAWINGS

The accompanying drawings that are incorporated in and constitute a part of this specification illustrate several embodiments of the disclosure and, together with the description, serve to explain the principles of the disclosure:

FIG. 11 illustrates method steps for an exemplary process for validating the performance of at least one security infrastructure within a scoped computing environment, according to some embodiments of the present disclosure.

FIG. 12 illustrates an exemplary computing system that may be used to implement computing functionality for one or more aspects of a security assessment system, according to some embodiments of the present disclosure.

DETAILED DESCRIPTION

Figure 1:
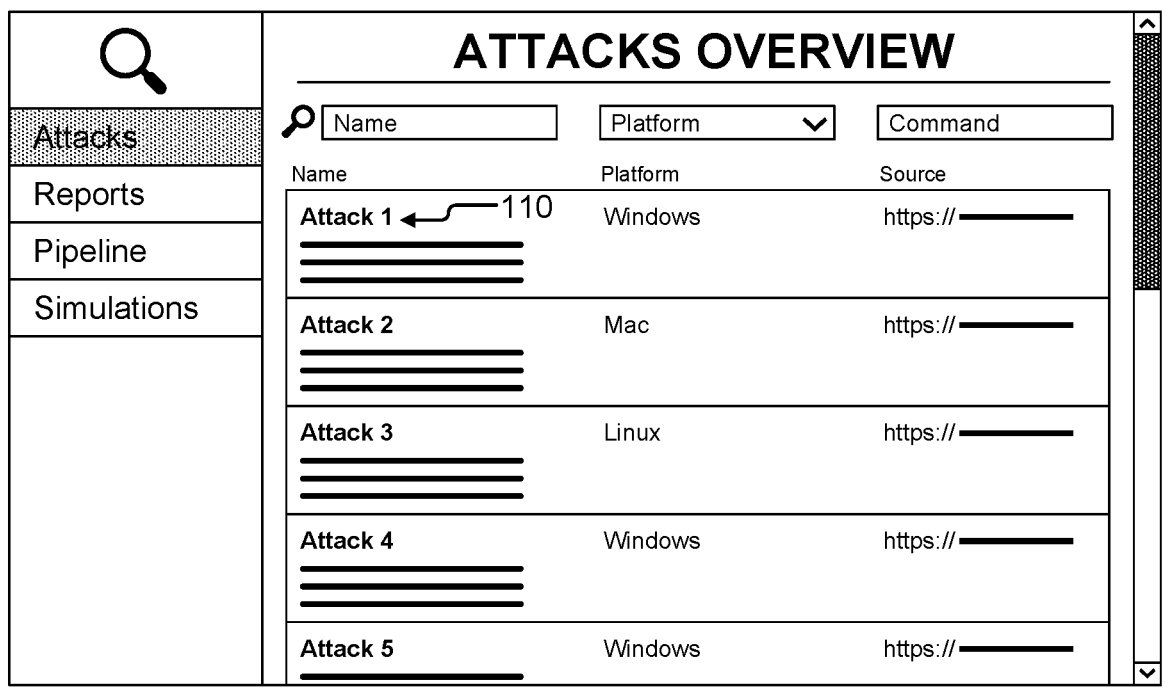
FIG. 1 illustrates an exemplary security assessment system for assessing security in a computing environment comprising a plurality of attacks, according to some embodiments of the present disclosure.

The present disclosure provides generally for systems and methods for assessing security in a computing environment. In some embodiments, the system may comprise at least one attack. In some implementations, the system may comprise two or more attacks simultaneously. In some aspects, the system may comprise one or more attack simulations wherein the results may be displayed in substantially real time.

According to the present disclosure, a system for assessing security in a computing environment may provide one or more security tools, attack software, customized payload, or at least one attack simulation library available in an agnostic fashion, which may create connectivity between blue teams and red teams and provide wholistic feedback regarding a company's security infrastructure while presenting one or more prioritized solutions, wherein the company's security infrastructure may comprise, by way of example and not limitation, a company's information and operational technology (IT/OT), internet of things (IOT), or cloud computing environment, as non-limiting examples.

In some aspects, a security assessment system is disclosed that may be configured to facilitate at least one security validation test within at least one scoped computing environment. In some implementations, the security validation test may be configured to determine whether a security infrastructure integrated with or otherwise associated with the scoped computing environment successfully detected one or more aspects of the security validation test, logged the detected aspect(s), and generated at least one notification indicating such detection(s). In some embodiments, the security validation test may comprise an amount of abnormal or unauthorized activity at or within one or more endpoints or other portions of the scoped computing environment.

In the following sections, detailed descriptions of examples and methods of the disclosure will be given. The descriptions of both preferred and alternative examples, though thorough, are exemplary only, and it is understood to those skilled in the art that variations, modifications, and alterations may be apparent. It is therefore to be understood that the examples do not limit the broadness of the aspects of the underlying disclosure as defined by the claims.

Glossary

Endpoint: as used herein, refers to any device that is physically an endpoint on a network. As a non-limiting list of examples, laptops, desktops, mobile phones, tablets, servers, information and operational technology (IT/OT) components, internet of things (IOT) devices, cloud computing environments, cloud systems, cloud services, virtual environments, or one or more portions of a network can all be considered endpoints.

Attack: as used herein, refers to one or more malicious pieces of computer code or applications that can damage a computer, such as, for example and not limitation, by stealing personal or financial information, or an amount of unauthorized activity occurring within one or more portions of a scoped computing environment.

In some embodiments, an attack may comprise an attempt to gain unauthorized access to one or more portions of a scoped computing environment, such as, for example and not limitation, a computer, computing system, or computer network with the intent to cause damage or steal data, as non-limiting examples In some implementations, an attack may disable, disrupt, destroy, or control one or more computing systems or alter, block, delete, manipulate, encrypt, or steal data held within one or more computing systems. In some aspects, an attack may comprise a plurality of techniques that target one or more specific portions of at least one security infrastructure of a scoped computing environment. In some embodiments, an attack may comprise a penetration test, a breach attack, a network access control vulnerability test, a vulnerability scanner, an internal or external automized penetration test of one or more attack path tools, cloud testing, a utilization of Command and Control (C2) frameworks, or one or more manual ad hoc user-generated attacks or scripts comprising a customized payload, as a list of non-limiting examples. In some aspects, an attack may comprise software available from one or more third parties. In some implementations, an attack may comprise software from two or more third parties.

Security validation test: as used herein refers to amount of abnormal or unauthorized activity intentionally or unintentionally implemented within at least one portion of a scoped computing environment, such as, for example and not limitation, at least one portion of at least one endpoint. By way of example and not limitation, a security validation test may comprise an amount of code that disrupts the normal functioning of a laptop computing device, such as disrupting the normal, routine, or typical processes that may be associated with software, hardware, and/or firmware of the laptop computing device, as non-limiting examples. In some implementations, a security validation test may be configured to test or validate one or more aspects of at least one security infrastructure associated with or integrated within one or more portions of a scoped computing environment, such as, for example and not limitation, the performance of one or more security tools associated with or integrated within one or more portions of the security infrastructure of the scoped computing environment. In some embodiments, a security validation test may comprise one or more of: a penetration test, a vulnerability scanner, cloud testing, a utilization of Command and Control (C2) frameworks, or one or more manual ad hoc user-generated scripts comprising a customized payload, as non-limiting examples.

Breach: as used herein refers to any successful attempt to gain access to a scoped computing environment via at least one attack or at least one security validation test. In some aspects, a breach may originate from externally from the scoped computing environment, or a breach may comprise unauthorized or abnormal activity occurring internally within the scoped computing environment due to at least one attack or at least one security validation test.

Scoped computing environment: as used herein refers to one or more computing devices, components, or systems, including software, hardware, or firmware, that may be targeted by at least one attack or affected by at least one breach. In some aspects, a scoped computing environment may comprise at least one endpoint. In some implementations, a scoped computing environment may comprise a production environment, a cyber range, or a mirrored/mimicked/fake environment, as non-limiting examples.

Security infrastructure: as used herein refers to any security or regulatory measures, devices, systems, protocols, or techniques that may be used to protect or maintain the intended functioning or operational integrity of a scoped computing environment. In some aspects, a security infrastructure may comprise one or more security tools, such as one or more network access controls, one or more firewalls, one or more endpoint detection and response (EDR) tools, one or more security information and event management (SIEM) tools, one or more security orchestration, automation, and response (SOAR) technologies, one or more ticketing systems, one or more exponential moving average (EMA) filters, one or more email gateways, one or more endpoint detection tools, one or more antivirus tools or software, or one or more endpoint security protocols, as a non-limiting list of examples.

User: as used herein refers to any human, device, system, or component that may utilize, interact with, transmit data or information to, or receive data or information from one or more aspects of a security assessment system. By way of example and not limitation, a user may comprise a security service provider or a client or customer thereof, an artificial intelligence infrastructure, or a security automation tool, as non-limiting examples.

Data source: as used herein refers to any portion(s) of a scoped computing environment that may generate and/or transmit at least one datum that may be received by one or more portions of at least one security infrastructure, such as, for example and not limitation, one or more security tools integrated or otherwise associated with the security infrastructure.

Referring now to FIG. 1, an exemplary security assessment system 100 for assessing security in a computing environment comprising a plurality of attacks 110, according to some embodiments of the present disclosure, is illustrated. In some embodiments, the security assessment system 100 may comprise at least one database comprising a plurality of attacks 110. In some implementations, the security assessment system 100 may be configured to interface with third-party software. In some aspects, the third-party software may comprise at least one attack 110.

In some embodiments, the security assessment system 100 may be configured to interface with a plurality of third-party software simultaneously. In some implementations, the security assessment system 100 may provide an interface between a plurality of third-party software and one or more security tools. In some aspects, the security assessment system 100 may allow attacks from two or more sources to be executed simultaneously, thereby providing agnostic feedback regarding two or more attack sources, such as third-party attack simulation packages, as a non-limiting example.

In some embodiments, the security assessment system 100 may provide a wholistic view of a plurality of attacks 110. It some implementations, the security assessment system 100 may provide feedback for testing and validating an attack or breach detection and alerting pipeline between two or more endpoints with a specific purpose and targeted scoped computing environment. In some aspects, a specific targeted scoped computing environment may comprise at least one server, at least one network entry or access point, at least one security tool, at least one network endpoint, one or more consoles, one or more servers, one or more network access controls configured to prevent network access resulting from one or more attacks, or any combination 20) thereof, as a list of non-limiting examples.

In some embodiments, the security assessment system 100 may provide connectivity between one or more attack programs and an intended security infrastructure. In some implementations, the security assessment system 100 may use this connectivity to overcome siloed information from independent attack and breach simulations, thereby forming a comprehensive view of the detection and alerting pipeline of a security infrastructure to generate one or more applicable solutions.

Some independent breach and attack simulations may use a closed feedback loop to use attack data constructively, but the software and corresponding information still remains siloed. In contrast, the security assessment system 100 of the present disclosure may be configured to interface with one or more attack tools, thereby creating an agnostic, wholistic view of the attacks and corresponding solutions to any deficiencies in the detection and alerting pipeline In some embodiments, the attacks may comprise one or more of a plurality of possible techniques. In some implementations, the security assessment system 100 may test the techniques simultaneously. In some aspects, the security assessment system 100 may conduct attack testing using a sampling process to test all penetration points or endpoints within a scoped computing environment. In some implementations, the sampling process may comprise testing a select number of endpoints within the scoped computing environment that may be representative of the scoped computing environment as a whole. In some aspects, artificial intelligence (AI), machine learning (ML), or one or more other coded instructions or algorithms may be implemented to the sampling process to alter which endpoints are tested dynamically. In some embodiments, the security assessment system 100 may present one or more results in substantially real time as a test is conducted. In some implementations, the result(s) may display what attacks were blocked, detected, alerted, logged, contained no evidence, or were not scored, as a non-limiting list of examples.

In some aspects, the result(s) may comprise one or more tool or software recommendations for one or more portions of the scoped computing environment that may be deemed unsatisfactory or missing. In some embodiments, the security assessment system 100 may assist in prioritizing one or more potential solutions. For example, the security assessment system 100 may present one or more higher level susceptibilities or deficiencies that, if fixed, may simultaneously resolve a multitude of other security risks deficiencies in the scoped computing environment. In some implementations, one or more fixes or solutions may be implemented in an at least partially autonomous fashion using one or more remediation tools.

Figure 2:
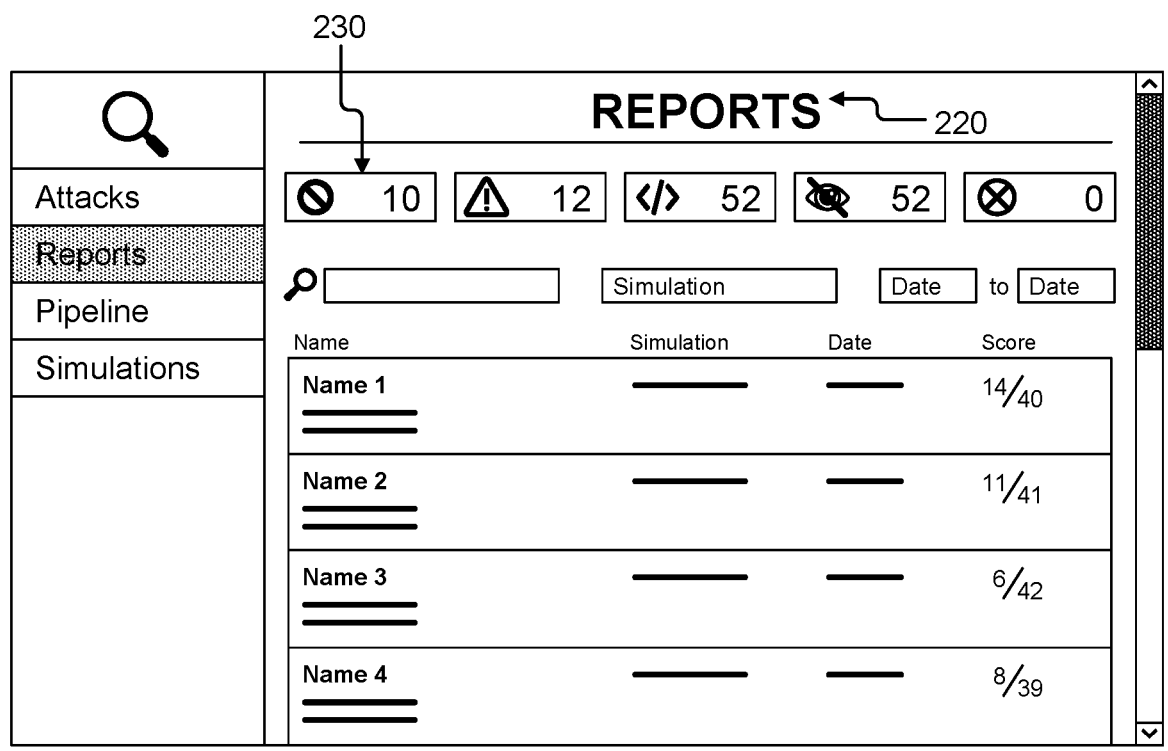
FIG. 2 illustrates an exemplary security assessment system comprising a report, according to some embodiments of the present disclosure.

Referring now to FIG. 2, an exemplary security assessment system 200 comprising a report 220, according to some embodiments of the present disclosure, is illustrated. In some embodiments, the report 220 may comprise one or more performance indicators 230.

In some implementations, the performance indicator(s) 230 may provide evaluative feedback on which attacks or techniques were blocked, detected, alerted, logged, contained no evidence, or were not scored, as a non-limiting list of examples. In some aspects, the performance indicator(s) may provide feedback into the deficiencies of the tested security infrastructure. By way of example and not limitation, the performance indicator(s) may be connected to one or more tools that facilitate one or more of the penetration points of a scoped computing environment.

Figure 3A:
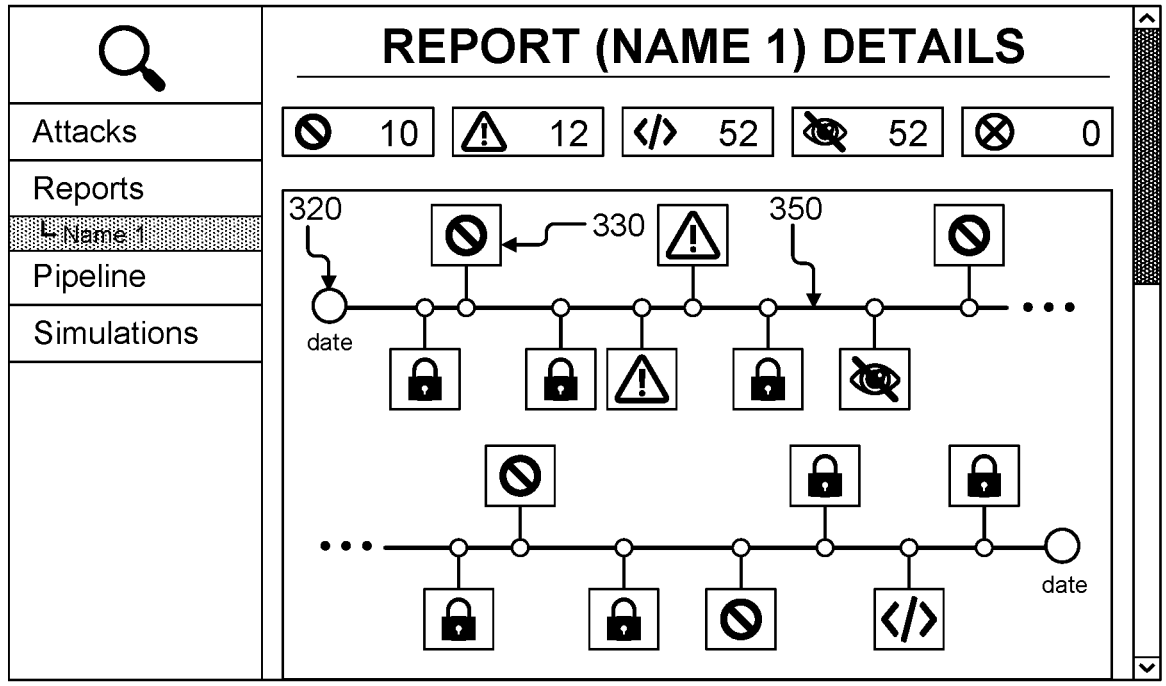
FIG. 3A illustrates an exemplary security assessment system comprising a report, according to some embodiments of the present disclosure.
Figure 3B:
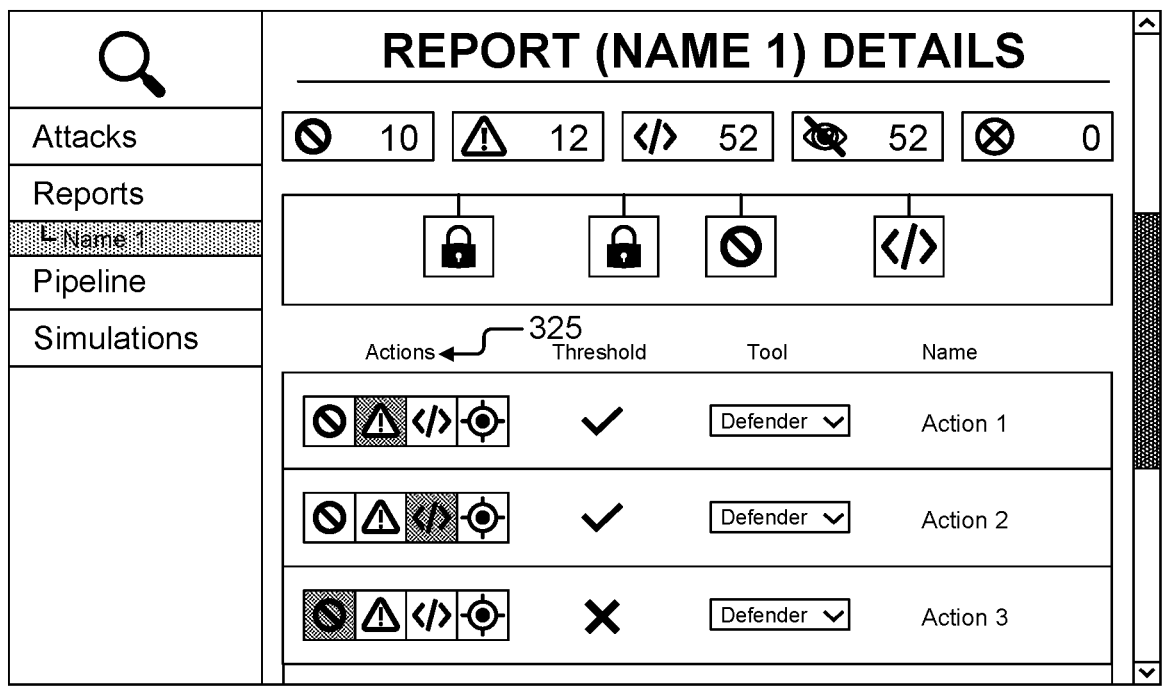
FIG. 3B illustrates an exemplary security assessment system comprising a report, according to some embodiments of the present disclosure.

Referring now to FIGS. 3A-B, an exemplary security assessment system 300 comprising a report 320, according to some embodiments of the present disclosure, is illustrated. In some embodiments, the report 320 may comprise one or more performance indicators 330. In some implementations, the report 320 may display one or more affected tools 350. In some aspects, each tools 350 may comprise an associated score 325. In some embodiments, one or more scores 325 may be generated in response to manual user input, or one or more scores 325 may be generated in an at least partially automated manner by security assessment system 300.

In some implementations, each score 325 may comprise at least one performance indicator 330 that provides feedback on the performance of the tools 350 during one or more specified attack simulations. In some aspects, the report 320 may comprise threshold indicators that are associated with each tool 350 and its associated performance indicator 330. In some embodiments, the threshold indicator may provide more insight into the acceptability of the performance of the tool 350 as indicated by the performance indicator 330 associated therewith.

As an illustrative example, a performance indicator 350 connected to a firewall may indicate that susceptibilities or deficiencies within the firewall allowed one of 15 simulated attacks to successfully penetrate the firewall. The acceptable threshold for firewall integrity for these specific attacks may be at an expected performance level of 90%. Thus, even though the performance indicator 350 notates a breach in security, the breach may be within the tolerance levels of the predetermined acceptable threshold and therefore, the breach may require little or no attention or remedy. This allows companies or entities to prioritize their security focus and avoid unnecessary or time-consuming security patches or other fixes or solutions on aspects of a security infrastructure that yield little overall benefit to the integrity of the security infrastructure.

In some implementations, one or more of the performance indicators 350 may comprise one or more regulatory compliance indicators. For example and not limitation, one or more performance indicators 350 may indicate that one or more compliance controls are in place, that they are working as intended or expected, and/or that they are working as intended in real time.

Figure 4:
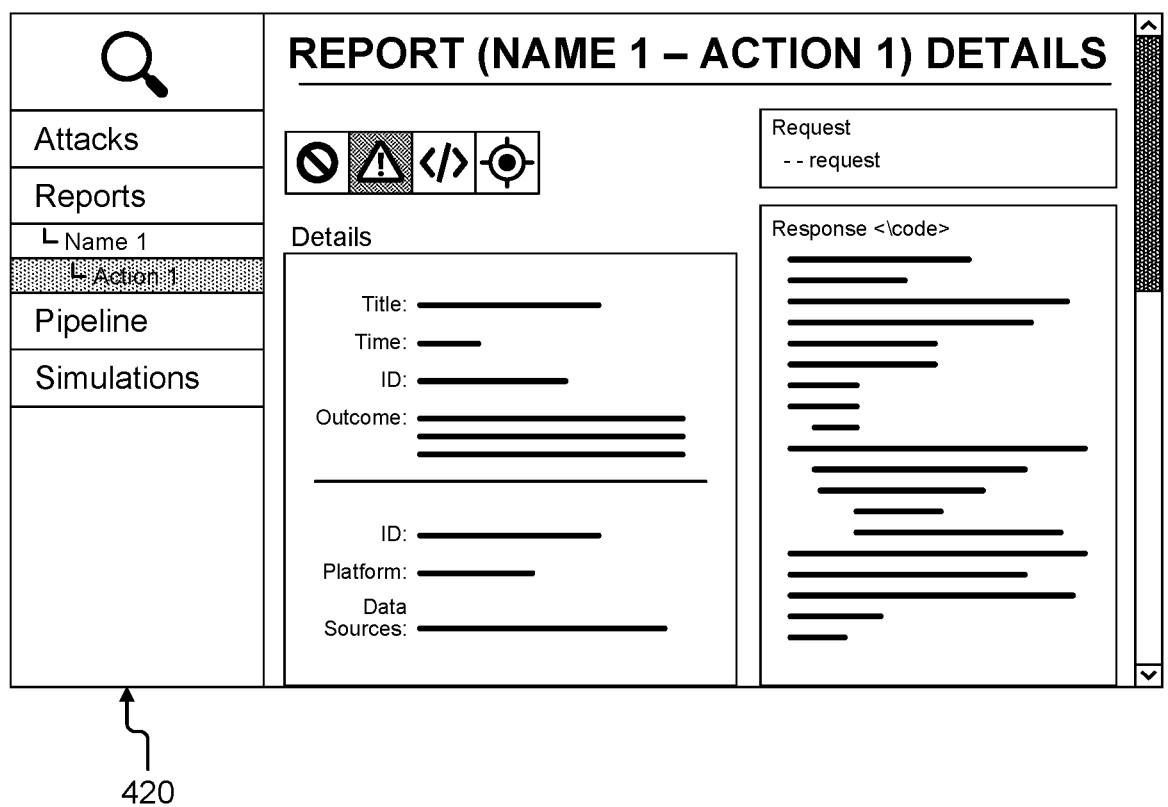
FIG. 4 illustrates an exemplary security assessment system comprising a report, according to some embodiments of the present disclosure.

Referring now to FIG. 4, an exemplary security assessment system 400 comprising a report 420, according to some embodiments of the present disclosure, is illustrated. In some embodiments, the report 420 may comprise a detailed analysis of each attack and tool presented therein. In some implementations, the report 420 may provide details for each breach resulting from an attack and may indicate which tool(s) failed.

In some aspects, the report 420 may provide insights into what technique(s) caused the security breach. In some embodiments, the report 420 may provide a ranked plurality of security solutions. In some implementations, each of the security solutions may comprise one or more of: infrastructure adjustments, builds, tool modifications, or software security patches, as a non-limiting list of examples. In some aspects, the report 420 may provide visibility into the security stack for a company, organization, or other entity.

As an illustrative example, the report 420 may provide a list of breaches and may provide an accompanying analysis that demonstrates that if the network access control is fortified, the adjustment would provide sufficient remediation to render the four subsequent solution recommendations unnecessary, because 80% of the susceptibility or deficiency is resolved. In some embodiments, the report 420 may visually illustrate the results of one or more prioritized solutions and their effect on the rest of the subsequent security infrastructure.

Figure 5:
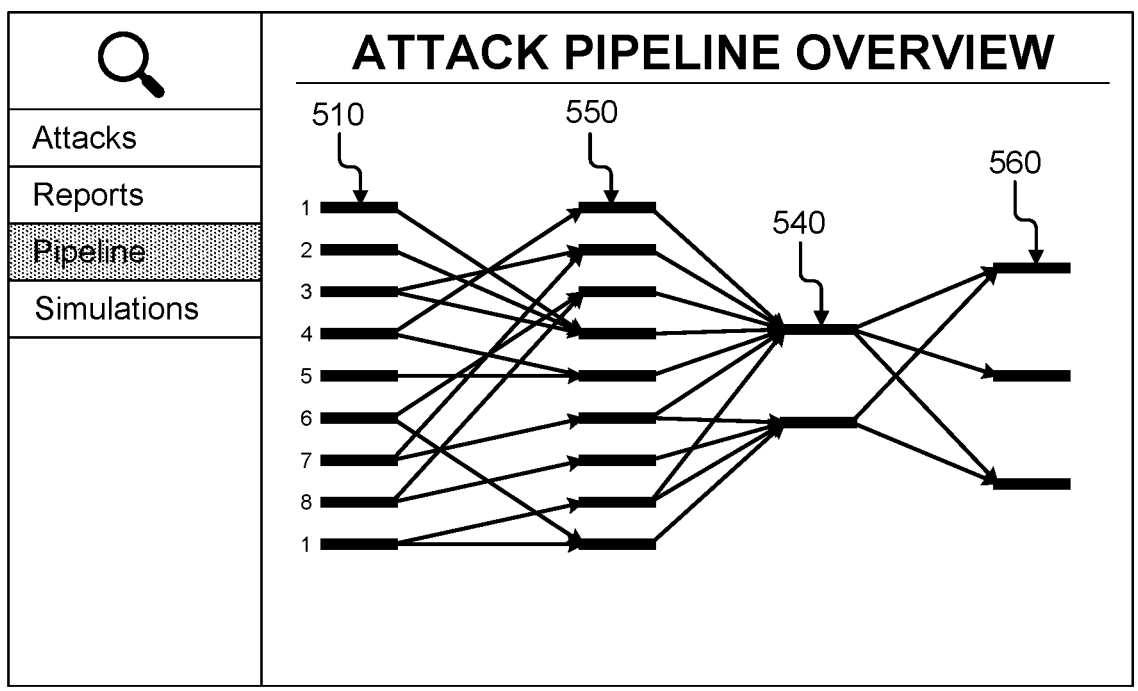
FIG. 5 illustrates an exemplary security assessment system comprising a report, according to some embodiments of the present disclosure.

Referring now to FIG. 5, an exemplary security assessment system 500 comprising a report, according to some embodiments of the present disclosure, is illustrated. In some embodiments, the report may comprise at least one attack 510. In some implementations, the report may comprise one or more tools. In some aspects, the report may describe a system's present defense status. In some embodiments, the report may describe one or more endpoints in the analyzed system.

In some implementations, the security assessment system 500 may allow a user to review an attack or breach simulation wholistically. For example, the security assessment system 500 may provide insights and feedback beginning at initial access to a network and may provide information until the attack simulation retrieves data from a scoped computing environment. In some aspects, the security assessment system 500 may provide visibility of a breach through one or more of a plurality of potentially integrated security tools, such as one or more network access controls, one or more firewalls, or one or more endpoint security protocols, as a non-limiting list of examples.

In some embodiments, the report may notify the user of which attacks or breaches did or did not generate any alerts. In some implementations, the report may use this alert information to provide insight into major gaps or deficiencies within a security infrastructure, as well as how to fix them.

In some aspects, the security assessment system 500 may provide security information for one or more tools in substantially real time. For example, the report may comprise an analysis on breaches and whether alerts were triggered for any consoles during an attack simulation. The feedback may then correspond to breaches and analysis for the servers and finally the endpoints in sequential order with the real-time execution of the attack simulation. In some embodiments, the report may provide insights into recurring trends in strengths and weaknesses in a detection and alerting pipeline for a scoped computing environment demonstrated by a plurality of attacks.

In some implementations, the security assessment system 500 may be configured to provide security information that compares the performance of a plurality of security tools or security stacks against each other. In some aspects, the security assessment system 500 may be configured to determine and present a grade, score, or ranking of each security tool or security stack. In some non-limiting exemplary embodiments, the security assessment system 500 may be configured to recommend or suggest a replacement for one or more security tools or security stacks within the security infrastructure of the scoped computing environment to improve the overall performance of the security infrastructure.

Figure 6:
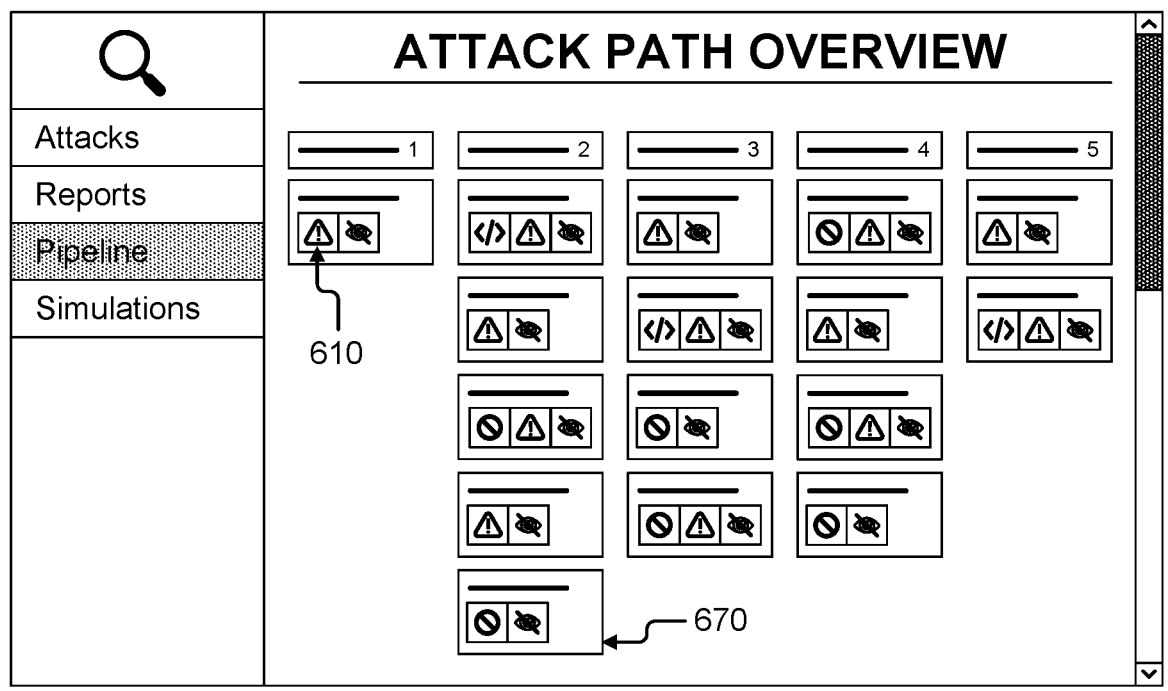
FIG. 6 illustrates an exemplary security assessment system comprising an attack path, according to some embodiments of the present disclosure.

Referring now to FIG. 6, an exemplary security assessment system 600 comprising an attack path 670, according to some embodiments of the present disclosure, is illustrated. In some embodiments, the attack path 670 may comprise one or more attacks 610.

In some implementations, the attack path 670 may catalogue one or more techniques that attackers may use to successfully gain access to a scoped computing environment. In some aspects, the security assessment system 600 may scan the endpoint(s) of a scoped computing environment and catalogue one or more security measures that may be associated or integrated therewith. For example, the attack path 670 may identify one or more tools that may be failing at an endpoint that may become access points for hackers to manipulate one or more security protocols of a security infrastructure by elevating access privileges to the scoped computing environment, as a non-limiting example.

In some embodiments, the attack path 670 may provide an evaluation of a scoped computing environment endpoint that may comprise one or more solutions to fix one or more deficiencies at the endpoint or associated with the endpoint. In some implementations, the attack path 670 may provide insights into potential risk points within the scoped computing environment.

In some aspects, the scoped computing environment may comprise an agentless structure. In some implementations, activity may be generated within the agentless scoped computing environment to exercise or test one or more network sensors or similar devices. In some embodiments, the agentless structure may operate in a cloud computing environment. In some implementations, the security assessment system 600 may be configured to execute one or more remote simulations and outline one or more attack paths 670 for cloud computing environments that may operate with one or more endpoints.

In some aspects, the attack path 670 may comprise a discovery functionality, wherein a discovery process may highlight the most likely attack paths 670 for a plurality of predetermined attacks 610. In some embodiments, one or more attacks 610 may execute a test on these attack paths 670. In some implementations, an attack path 670 may comprise an explanation of the necessity of addressing a plurality of risks. In some aspects, the risks may vary in severity. In some embodiments, an attack path 670 may present one or more solutions comprising native tools or tools within the security assessment system 600 that may resolve those risks.

Figure 7:
FIG. 7 illustrates an exemplary security assessment system comprising a report, according to some embodiments of the present disclosure.

Referring now to FIG. 7, an exemplary security assessment system 700 comprising a report, according to some embodiments of the present disclosure, is illustrated. In some embodiments, the report may comprise one or more attacks 710. In some implementations, the report may comprise one or more performance indicators 730. In some aspects, the report may describe one or more tools. In some embodiments, the report may comprise one or more baseline threshold parameters for determining unusual activity within a scoped computing environment.

In some embodiments, the security assessment system 700 may comprise at least one project management tool that may guide users into full engagement with the security assessment system 700. In some implementations, the security assessment system 700 may assist with every step of an attack, breach, or other non-limiting simulation. In some aspects, the assistance may comprise a sequential process that comprises planning, execution, and the development of an analysis report, as non-limiting examples of events within an attack or breach analysis.

In some embodiments, the assisted sequential process may comprise an automated questionnaire that may assist in determining which attacks may be most effective at testing a security infrastructure.

In some implementations, the security assessment system 700 may comprise one or more attack analytics. In some embodiments, an analytics engine may comprise the attack analytics. In some aspects, the attack analytics may comprise information about whether the attack should trigger an associated defense. In some embodiments, the attack analytics may provide a notification when an attack does not trigger an associated defense as intended.

In some implementations, the security assessment system 700 may operate an intermediary software. In some aspects, the security assessment system 700 may allow an existing security team to execute one or more attack or breach software packages from various third-party users while facilitating the execution and analysis with the security team's existing security infrastructure.

In some embodiments, the security assessment system 700 may auto-populate one or more tools of one or more security providers demonstrating security risks deficiencies within a detection and alerting pipeline to potential clients. In some implementations, the security assessment system 700 may integrate with existing software and demonstrate deficiencies in a presently-used security infrastructure and associated protocol not associated with the security assessment system 700, but rather provided from other security providers. In some aspects, the security assessment system 700 may enable security providers to sell their products as well as demonstrate the deficiencies of a competing security provider.

Figure 8:
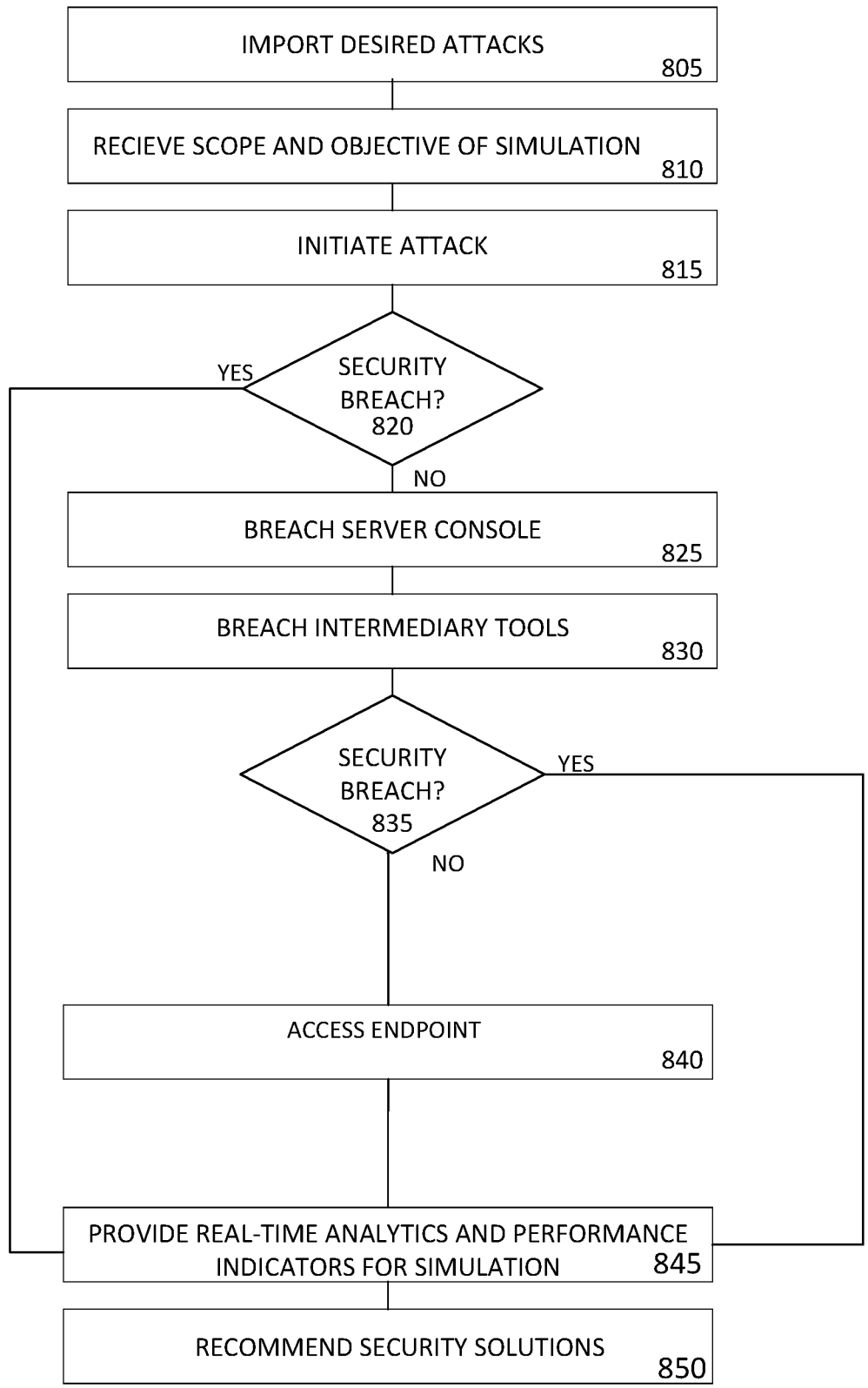
FIG. 8 illustrates method steps for an exemplary process for assessing security within a scoped computing environment, according to some embodiments of the present disclosure.

Referring now to FIG. 8, method steps for an exemplary process 800 for assessing security in a scoped computing environment, according to some embodiments of the present disclosure, are illustrated. In some aspects, at 805, a security assessment system may import one or more attacks, wherein the one or more attacks may be used by an intended purple team attack simulation. In some embodiments, the attacks may be sourced from one or more of a plurality of third-party software, from at least one database or other storage medium comprising one or more stored attacks, from one or more proprietary attack tools, or from external C2 frameworks, as non-limiting examples. In some implementations, the attacks may be selected based upon at least one predetermined simulation criterion for at least one purple team attack simulation, such as testing one or more network access ports, as a non-limiting example.

In some implementations, at 810, the security assessment system may receive at least one objective, goal, and/or scope of the intended purple team attack simulation using the one or more imported attacks. In some embodiments, the selection of a goal may comprise a selection of one or more security tools that will be subjected to and tested by the attack simulation. In some implementations, a security infrastructure of a scoped computing environment may comprise the target of the attack simulation. In some aspects, the attack simulation may comprise a virtual simulation. In some embodiments, the security assessment system may comprise at least one database that comprises one or more attack simulations. In some implementations, the security assessment system may comprise an interactive tutorial for conducting at least one attack simulation In some aspects, at 815, the security assessment system may initiate at least one attack as part of a purple team attack simulation, wherein access to the network of the scoped computing environment may be initiated and wherein the attack may begin by attempting to gain network access to the scoped computing environment using one or more selected attack techniques. In some implementations, the attack and its success in gaining network access may be indicated or quantified by one or more performance indicators that may indicate whether the attack was detected by one or more network access security tools or other security tools and whether the network access security tools executed one or more proper defenses. In some aspects, the performance indicators may indicate whether the attack was properly detected, blocked, received the proper alerts, was logged, provided no evidence of an attack, or was not scored, or any combination thereof, as a list of non-limiting examples.

In some implementations, at 820, the security assessment system may relay information about the performance of the network access tools and the associated performance indicators to be presented as one or more real-time analytics provided by the security assessment system as it reports on the current simulation. In some implementations, at least one analytics engine may comprise the real-time analytics. In some embodiments, at 825, the attack may attempt to attack, breach, or both, the scoped computing environment, wherein the attack simulation may attempt to gain access to one or more portions of the scoped computing environment, such as at least one network, at least one server, or at least one console, as non-limiting examples. In some implementations, the performance of the relevant security tools and associated performance indicators may be recorded and stored in at least one database.

In some aspects, at 830, the attack may attempt to breach or gain access to one or more portions of the security infrastructure of the scoped computing environment, such as by attempting to gain access to one or more security tools, or one or more firewalls, as non-limiting examples. In some embodiments, one or more of the security tools may comprise at least one compliance control. In some implementations, at 835, the status and success of security tools and controls within the scoped computing environment may be assessed, and information about the performance of these tools may be generated and presented as one or more real-time analytics provided by the security assessment system as it reports on the current simulation. In some aspects, the security assessment system may be configured to provide information about the attack in connection to each of the one or more security tools.

In some implementations, at 840, the attack may attempt to gain access to one or more endpoints of the scoped computing environment. In some implementations, each endpoint may comprise at least one endpoint security protocol and at least one analytics engine. In some embodiments, the at least one analytics engine may be configured to provide and present one or more real-time analytics for at least one attack simulation, store at least one list of one or more attack techniques, determine a score for one or more security tools used within a security infrastructure of a scoped computing environment, generate at least one performance indicator to indicate or quantify the performance of the one or more security tools, and provide and present at least one recommended security solution.

In some aspects, the endpoint analytics engine may be configured to automatically implement the at least one recommended security solution. In some implementations, the endpoint analytics engine may be configured to notate any security tools, such as, for example and not limitation, one or more network access controls, that provide any response other than an expected defensive response. In some embodiments, the analytics engine may be configured to provide one or more insights about reoccurring trends associated with one or more attacks and/or one or more attack techniques. In some aspects, the security assessment system may generate and provide one or more real-time analytics of existing security tools associated with the endpoint.

In some embodiments, at 845, the security assessment system may generate, provide, and present one or more real-time analytics and/or performance indicators for the simulation. In some implementations, the security assessment system may determine a score for each security tool used within the security infrastructure of the scoped computing environment, wherein each security tool score may comprise one or more evaluative metrics derived from the attacks executed on the security tools. In some aspects, the security tool scores may be stored within one or more security tool data logs within one or more databases. In some implementations, the analytics may comprise one or more reports that may outline details of the attack simulation, such as the attack paths, attack techniques used, and performance indicators for the tested scoped computing environment.

In some aspects, at 850, the security assessment system may provide and present one or more recommended security solutions for discovered breaches in the existing security infrastructure of the scoped computing environment. In some embodiments, the security assessment system may store at least one list of one or more utilized attack techniques within at least one database. In some aspects, a single attack may use a plurality of attack techniques. In some additional aspects, an attack may only use a single attack technique. In some implementations, all of the attack techniques used in a single attack may be performed, tested, analyzed, and/or evaluated simultaneously.

In some embodiments, the recommended security solutions may prioritize security solutions that may solve a plurality of security risks or deficiencies within a detection and alerting pipeline of a scoped computing environment. For example, adoption of a specific tool for preventing network access may reduce the susceptibility of subsequent security tools and the endpoint(s) associated therewith. In some aspects, at least one of the recommended security solutions may comprise information received from a third-party software integration. In some implementations, the third-party software integration may supplement the recommended security solution(s).

Figure 9:
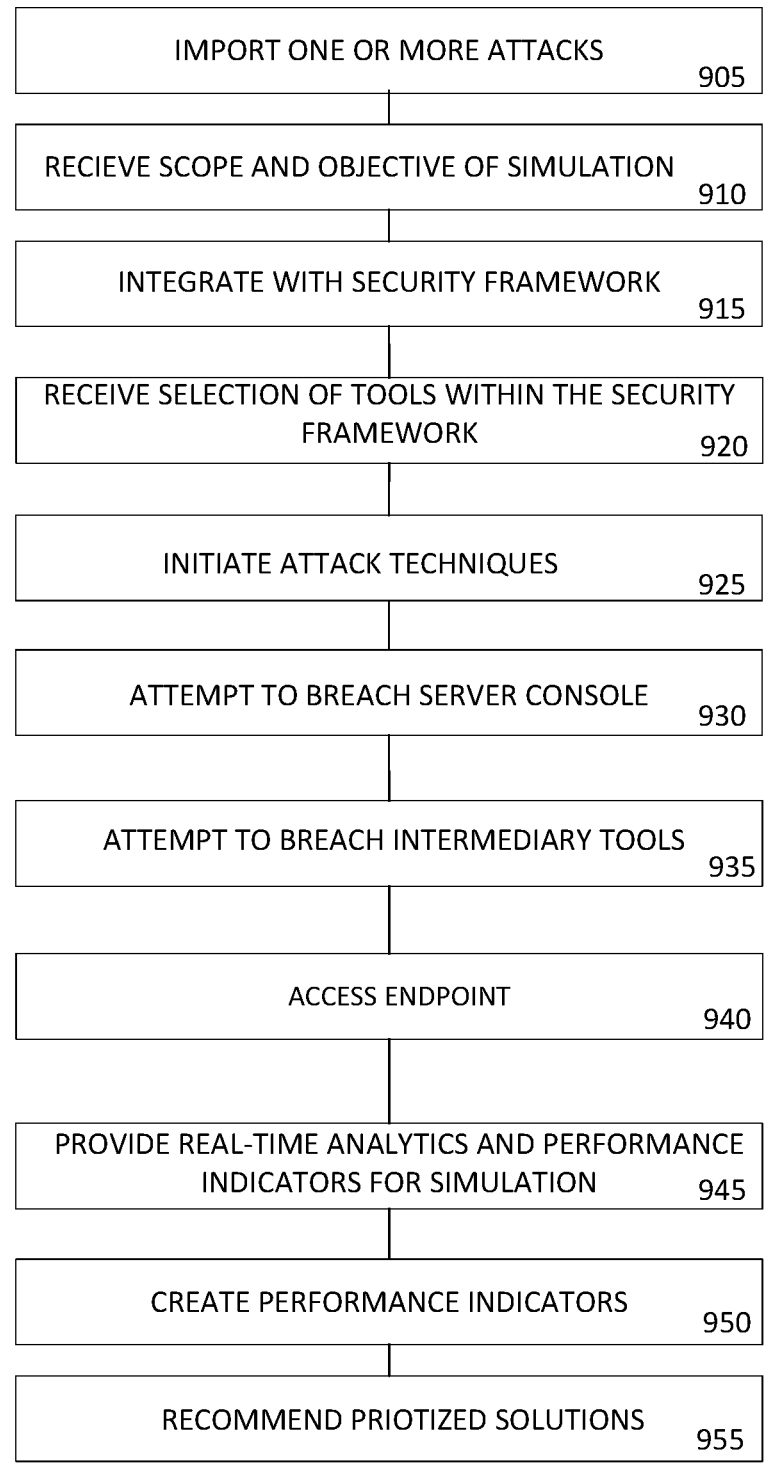
FIG. 9 illustrates method steps for an exemplary process for assessing security within a scoped computing environment, according to some embodiments of the present disclosure.

Referring now to FIG. 9, method steps for an exemplary process 900 for assessing security within a scoped computing environment, according to some embodiments of the present disclosure, are illustrated. In some aspects, at 905 a security assessment system may import one or more attacks. In some embodiments, the attacks may be sourced from one or more of a plurality of third-party software, from at least one database or other storage medium comprising one or more stored attacks, from one or more proprietary attack tools, or from external C2 frameworks, as non-limiting examples. In some implementations, the attacks may be selected based upon at least one predetermined simulation criterion for at least one purple team attack simulation, such as testing one or more network access ports, as a non-limiting example.

In some implementations, at 910, the security assessment system may receive at least one objective, goal, and/or scope of the intended purple team attack simulation. In some embodiments, the selection of a goal may comprise a selection of one or more security tools that will be tested by the attack simulation.

In some aspects, at 915, the security assessment system may be integrated with at least one scoped computing environment. In some embodiments, the scoped computing environment may comprise at least one security infrastructure. In some aspects, the scoped computing environment may comprise a target of the purple team attack simulation. In some implementations, at 920, the security assessment system may receive a selection of one or more security tools to test within the at least one security infrastructure of the scoped computing environment, or, in some aspects, the security assessment system may select the one or more security tools for testing in an at least partially autonomous fashion. In some implementations, testing the one or more selected security tools may comprise subjecting the one or more security tools to the purple team attack simulation.

In some aspects, at 925, the security assessment system may initiate at least one attack as part of a purple team attack simulation, wherein the attack may begin by gaining network access the scoped computing environment using one or more selected attack techniques. In some implementations, the attack and its success in gaining network access may be indicated or quantified by one or more performance indicators that may indicate whether the attack was detected by one or more network access security tools (or other security tools) and whether the network access security tools executed one or more proper defenses. In some aspects, the performance indicators may indicate whether the attack was properly detected, blocked, received the proper alerts, logged, provided no evidence of an attack, or was not scored, or any combination thereof, as a list of non-limiting examples.

In some embodiments, at 930, the attack may attempt to attack, breach, or both, the scoped computing environment. In some implementations, the performance of the associated security tools and performance indicators may be recorded and stored in at least one database. In some aspects, at 935, the attack may attempt access against one or more security tools of at least one security infrastructure of the scoped computing environment.

In some implementations, at 940, the attack may access the endpoints of the scoped computing environment. In some aspects, the security assessment system may generate, provide, and present one or more real-time analytics of one or more existing security tools associated with one or more of the endpoints. In some embodiments, at 945, the security assessment system may generate, provide, and present one or more real-time analytics and performance indicators for the simulation. In some implementations, the analytics may comprise one or more reports that may outline details of the attack simulation, such as the attack paths, attack techniques used, and performance indicators for the tested scoped computing environment.

In some embodiments, at 950, the security assessment system may generate or create one or more performance indicators that may be presented to indicate or quantify the performance of the tool(s) targeted during the attack simulation. In some aspects, at 955, the security assessment system may provide and present one or more recommended solutions for discovered gaps or deficiencies in the existing security infrastructure of the scoped computing environment.

In some embodiments, the recommended solutions may prioritize solutions that may solve a plurality of security risks or deficiencies within a detection and alerting pipeline of a scoped computing environment. For example, adoption of a specific tool for preventing network access may reduce the susceptibility of subsequent security tools and the endpoint(s) associated therewith.

Figure 10:
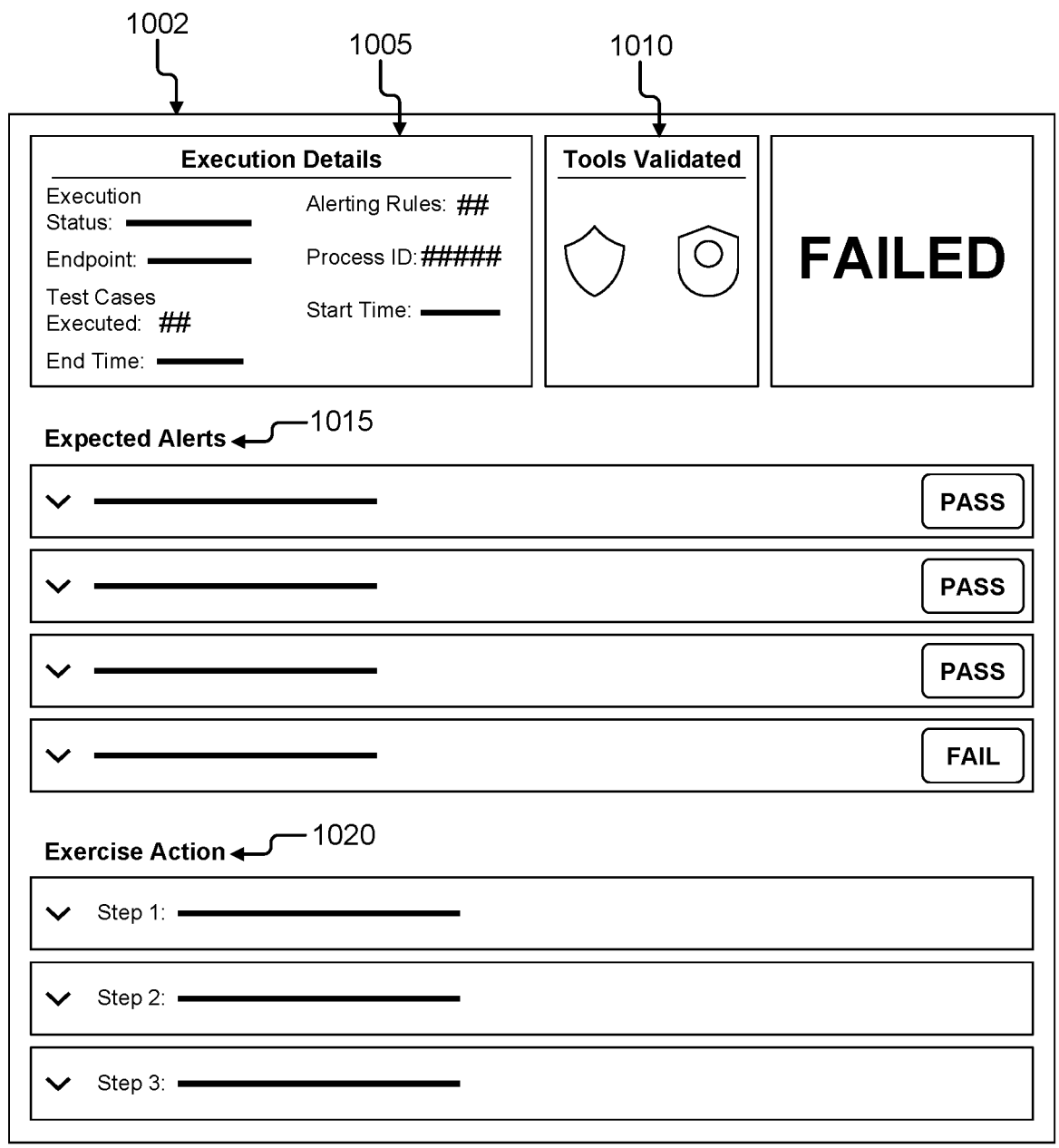
FIG. 10 illustrates an exemplary user interface generated by a security assessment system, according to some embodiments of the present disclosure.

Referring now to FIG. 10, an exemplary user interface 1002 generated by a security assessment system 1000, according to some embodiments of the present disclosure, is illustrated. In some implementations, the user interface 1002 may be configured to provide at least one user with one or more visual representations of one or more aspects pertaining to the functionality, operation, performance, or configuration of the security assessment system 1000. In some embodiments, the user interface 1002 may be displayed via at least one display screen or similar display mechanism integrated with or communicatively coupled to at least one computing device. In some aspects, one or more users may be able to interact with the user interface 1002 by using one or more input devices integrated with or communicatively coupled to the computing device. By way of example and not limitation, each input device may comprise one or more of: a keyboard, a keypad, a touchscreen, a pointing device (e.g., a mouse), a camera, a microphone, an accelerometer, or a motion sensor, as non-limiting examples. In some embodiments, the security assessment system 1000 may comprise at least one storage medium that comprises one or more coded instructions or algorithms configured to be accessed and executed by at least one processing device such that the processing device may at least partially facilitate or enable the performance, functionality, or operation of one or more aspects of the security assessment system 1000.

In some implementations, the security assessment system 1000 may be configured to validate the performance of at least one portion of at least one security infrastructure within at least one scoped computing environment. In some aspects, the security infrastructure may comprise one or more data sources. In some non-limiting exemplary embodiments, the security infrastructure may comprise a plurality of data sources. In some implementations, the scoped computing environment may comprise one or more endpoints, wherein at least a portion of the the data sources of the security infrastructure may be configured within the endpoint(s). In some aspects, the scoped computing environment may comprise a plurality of endpoints.

In some implementations, the security infrastructure of the scoped computing environment may be configured to generate one or more alerts or similar notifications 1015, wherein the generation of each notification 1015 may be at least partially based on data received from one or more of the data sources. In some non-limiting exemplary embodiments, the security infrastructure may comprise one or more security tools 1010. In some aspects, by way of example and not limitation, each security tool 1010 may comprise an amount of computational hardware and/or software configured to receive data from at least a portion of the data sources, determine whether at least one notification 1015 needs to be generated based on the receiver data, and, if necessary, generate the required notification(s) 1015. In some embodiments, the generated notification(s) 1015 may be transmitted and presented to at least one user of the security infrastructure, such as, for example and not limitation, a manager, supervisor, or administrator of the security infrastructure, or at least one artificial intelligence infrastructure.

In some aspects, each security tool 1010 of the security infrastructure of the scoped computing environment may be configured to analyze or otherwise assess the data received from the data sources to determine whether abnormal or unauthorized activity may be occurring at one or more of the endpoints of the scoped computing environment. In some implementations, each security tool 1010 may be configured to generate at least one notification 1015 upon an affirmative determination that abnormal or unauthorized activity is occurring. In some non-limiting exemplary embodiments, each security tool 1010 may be configured to generate at least one log or similar record of the occurrence of abnormal or unauthorized activity, wherein the logged occurrence may be at least temporarily stored within at least one storage medium.

In some implementations, the security assessment system 1000 may be configured to facilitate the execution of at least one security validation test within the scoped computing environment. In some aspects, the security validation test may be configured to implement an amount of abnormal or unauthorized activity within at least one portion of at least one endpoint of the scoped computing environment. In some non-limiting exemplary embodiments, the security validation test may be configured to implement abnormal or unauthorized activity within every endpoint of the scoped computing environment, including, where applicable, every endpoint from a first endpoint of the scoped computing environment to a final endpoint of the scoped computing environment. In some implementations, the security validation test may be configured to implement one or more exercise actions 1020 within one or more portions of the scoped computing environment. In some aspects, at least a portion of the exercise action(s) 1020 may comprise an amount of abnormal or unauthorized activity within the scoped computing environment.

In some implementations, the user interface 1002 may be configured to display one or more execution details 1005 for a security validation test executed within a scoped computing environment. By way of example and not limitation, the execution details 1005 may include the execution status of the security validation test (such as, for example and not limitation, "in progress" or "complete"), the identification of one or more endpoints targeted by the security validation test, the number of test cases executed, the number of alerting rules tested, a process identification number for the security validation test, and a start and end time for the security validation test, as non-limiting examples. In some embodiments, the user interface 1002 may indicate one or more security tools 1010 of the security infrastructure of the scoped computing environment that may be the subject or target of the security validation test.

In some aspects, the security assessment system 1000 may be configured to be integrated with the scoped computing environment and the security infrastructure associated therewith. In some implementations, the security assessment system 1000 may be configured to identify all of the data sources and, if applicable, security tools 1010 of the security infrastructure as well as the notification(s) 1015 required or expected to be generated upon a detection of abnormal or unauthorized activity at or within one or more endpoints of the scoped computing environment. In some embodiments, the security assessment system 1000 may be configured to access the data sources and/or security tools 1010 of the security infrastructure to determine whether all of the abnormal or unauthorized activity implemented by the security validation test was detected and logged by the security infrastructure, and also whether the security infrastructure generated every required or expected notification 1015 pertaining to the detected abnormal or unauthorized activity. In some aspects, the security assessment system 1000 may be configured to identify one or more new data sources that may need to be added to the security infrastructure to enable the security infrastructure to detect all of the activity implemented by the security validation test.

In some implementations, the security assessment system 1000 may be configured to generate one or more notifications upon a determination that one or more components or processes of the security infrastructure, such as, for example and not limitation, one or more security tools 1010, failed one or more aspects of the implemented security validation test. In some embodiments, such notification(s) may be transmitted and presented to at least one user of the security assessment system 1000. In some non-limiting exemplary implementations, the 25 notification(s) may be generated and transmitted in substantially real time upon a determination that one or more components or processes of the security infrastructure failed. By way of example and not limitation, the security assessment system 1000 may be configured to generate at least one notification upon a determination that the security infrastructure failed to detect and/or log at least a portion of the abnormal activity implemented by the security validation test or upon a determination that the security infrastructure failed to generate at least one notification 1015 of detected and/or logged abnormal activity, as non-limiting examples.

In some aspects, upon a determination that one or more security tools 1010 failed one or more aspects of a security validation test, the security assessment system 1000 may be configured to generate one more suggestions or recommendations for one or more solutions to modify, adjust, or otherwise alter the performance of the security tool(s) 1010 to avoid or minimize the likelihood of future failure, In some non-limiting exemplary embodiments, the security assessment system 1000 may be configured to suggest or recommend one or more security tools 1010 that may perform better when subjected to the security validation test. By way of example and not limitation, the security assessment system 1000 may reference data within one or more databases that comprises statistical information regarding the comparative performance of different security tools 1010 subjected to various types of security validation tests such that the highest scoring or highest ranking tools 1010 may be suggested or recommended to users of the security assessment system 1000. In some implementations, at least one artificial intelligence infrastructure and/or one or more machine learning algorithms may facilitate the identification and recommendation of security tools 1010.

In some non-limiting exemplary embodiments, the security assessment system 1000 may be configured to assess the functional status of one or more security tools 1010 within a security infrastructure to determine if the security tool(s) 1010 are operating or functioning at a maximum effectiveness level. In some implementations, each security tool 1010 may comprise one or more features that may be altered between an "on" or "off" state or between an "active" or "inactive" state such that the security assessment system 1000 may be able to identify a configuration of "on" or "active" states that may allow the security tools 1010 to function most effectively.

In some aspects, one or more portions of the security infrastructure, such as, for example and not limitation, one or more of the security tools 1010, may comprise one or more alerting rules that may dictate or determine when one or more notifications 1015 are generated. In some implementations, if one or more security tools 1010 or other portion(s) of the security infrastructure fail one or more aspects of a security validation test, the security assessment system 1000 may be configured to identify one or more unused (or inactive) and/or new alerting rules that may facilitate improved performance of the security infrastructure. In some non-limiting exemplary embodiments, the security assessment system 1000 may be configured to suggest or instruct how to develop the newly identified alerting rule(s). In some implementations, the security assessment system 1000 may comprise at least one artificial intelligence infrastructure and/or one or more machine learning or similar algorithms that may be configured to generate at least a portion of the newly identified alerting rules. In some embodiments, a user of the security assessment system 1000 may be able to input or enter new alerting rules as desired or needed. In some aspects, all of the alerting rules, including any newly added or developed alerting rules, may be validated or otherwise tested by a security validation test.

In some aspects, the security assessment system 1000 may be configured to determine one or more time intervals associated with the performance of the security infrastructure of the scoped computing environment. In some non-limiting exemplary embodiments, the security assessment system 1000 may be configured to use one or more time stamps or similar data generated by the security infrastructure to determine one or more time intervals. By way of example and not limitation, the security assessment system 1000 may be configured to determine an amount of time between the detection of abnormal activity implemented by the security validation test and the generation of one or more notifications 1015 pertaining to the abnormal activity, as a non-limiting example. In some implementations, this may help one or more users of the security assessment system 1000 assess the performance of the security infrastructure.

In some embodiments, the security assessment system 1000 may be configured to implement a unique security validation test within the scoped computing environment on a routine or continuous, ongoing, or recurring basis. In some implementations, the security validation test may be initiated by the security assessment system 1000 in an at least partially autonomous manner. In some non-limiting exemplary embodiments, the security validation test may be initiated by the security assessment system 1000 in a completely autonomous manner. In some aspects, the security validation test may be implemented during an uptime of the scoped computing environment.

Referring now to FIG. 11, method steps for an exemplary process 1100 for validating the performance of at least one security infrastructure within a scoped computing environment, according to some embodiments of the present disclosure, are illustrated. In some implementations, process 1100 may be at least partially facilitated by a security assessment system. In some aspects, at 1105, at least one security assessment system may be integrated with at least one scoped computing environment. In some implementations, the scoped computing environment may comprise at least one security infrastructure. In some aspects, the security infrastructure may comprise one or more data sources configured within one or more endpoints of the scoped computing environment. In some embodiments, the security infrastructure may comprise one or more security tools, wherein each security tool may be configured to receive and analyze or otherwise assess data transmitted from or generated by the data source(s). In some aspects, at least one endpoint of the scoped computing environment may comprise the target of at least one security validation test implemented by the security assessment system. In some non-limiting exemplary embodiments, every endpoint within the scoped computing environment may comprise the target of the security validation test.

In some implementations, the security validation test implemented by the security assessment system may comprise an amount of abnormal or unauthorized activity generated within one or more portions of the scoped computing environment, such as, for example and not limitation, one or more endpoints of the scoped computing environment. As a non-limiting illustrative example, an endpoint may comprise a laptop computing device and the security validation test may comprise an amount of code that disrupts the normal functioning of the laptop computing device, such as disrupting the normal, routine, or typical processes that may be associated with software, hardware, and/or firmware of the laptop computing device, as non-limiting examples. As an additional non-limiting example, an endpoint may comprise a cloud computing environment, and the security validation test may comprise an amount of simulated unauthorized activity that may not be permitted under one or more rules or guidelines, such as, for example and not limitation, importing one or more data files from at least one database external from the cloud computing environment, such that successfully importing one or more data files may comprise a failure of one or more portions of a security infrastructure of the cloud computing environment that requires one or more alert notifications to be generated and transmitted. In some aspects, the security validation test may be imported, either automatically or manually, from at least one database or similar storage medium comprising one or more stored security validation tests or from one or more third-party sources or databases, as non-limiting examples.

In some implementations, at 1110, at least one security validation test may be initiated within the scoped computing environment, wherein the security validation test may be configured to test or validate one or more aspects of at least one security infrastructure associated with or integrated within one or more portions of the scoped computing environment. In some non-limiting exemplary embodiments, the security validation test may be configured to test or validate the performance of one or more security tools associated with or integrated within one or more portions of the security infrastructure of the scoped computing environment.

By way of example and not limitation, the security validation test may be configured to validate at least one process wherein one or more security tools of the security infrastructure may be configured to detect and/or log data associated with abnormal activity occurring within the scoped computing environment, including abnormal activity that may be occurring at or within one or more endpoints of the scoped computing environment, to determine whether the security tool(s) (or other portion(s) of the security infrastructure) successfully detect the abnormal activity, log or otherwise record the occurrence of the abnormal activity in at least one database or similar storage medium, and/or generate, transmit, and present one or more alerts or notifications to one or more users of the security assessment system such that the user(s) may be made aware that the abnormal activity occurred. In some non-limiting exemplary embodiments, the generated notification(s) may be presented via at least one user interface generated and presented via at least one computing device.

In some aspects, the security validation test may be configured to be initiated by the security assessment system in a partially or completely autonomous manner by the security assessment system on a continuous or recurring basis or at one or more predetermined scheduled times or intervals. In some implementations, the security validation test may be initiated at one or more predetermined times manually set by one or more users. In some non-limiting exemplary embodiments, the security validation test may be initiated by one or more users as needed or desired in an on-demand or ad hoc fashion. In some aspects, the security validation test may be initiated and executed, either automatically or manually, during an uptime of the scoped computing environment.

In some embodiments, at 1115, at least one determination may be made as to whether one or more aspects or portions of the security validation test were successfully detected by the security infrastructure of the scoped computing environment, such as, for example and not limitation, whether an amount of abnormal activity was successfully detected and/or logged or otherwise recorded by one or more security tools of the security infrastructure at or within at least one endpoint of the scoped computing environment. In some implementations, this determination may be at least partially enabled by the security assessment system being communicatively coupled to or otherwise integrated with the security infrastructure of the scoped computing environment. In some aspects, by being configured to access data associated with both the security validation test as well as the security infrastructure, the security assessment system may be able to determine whether all of the abnormal activity expected to be detected and/or logged by the security infrastructure was in fact detected and/or logged, as well as whether all of the notifications expected to be generated and transmitted by the security infrastructure were in fact generated and transmitted.

In some aspects, at 1120, at least one determination may be made as to whether the at least one security infrastructure of the scoped computing environment generated at least one notification indicating that at least a portion of the abnormal or unauthorized activity implemented by the security validation test was detected. In some implementations, each notification may comprise an alert that the security assessment system may push out or otherwise transmit to be presented to one or more users for display via at least one user interface that may be generated and presented via at least one computing device. In some aspects, by way of example and not limitation, one or more of the generated notifications may be transmitted to at least one security information and event management (SIEM) tool, at least one security operations center (SOC), one or more security orchestration, automation, and response (SOAR) technologies, or one or more ticketing systems, as non-limiting examples. In some non-limiting exemplary embodiments, the security assessment system may be configured to determine whether any generated notifications were successfully transmitted to every relevant or required portion of the security infrastructure of the scoped computing environment.

In some embodiments, at 1125, the security assessment system may be configured to determine whether at least one remedial measure or similar response was implemented by at least one user of the security assessment system, such as a human, device, system, or component in response to at least one generated notification of abnormal or unauthorized activity detection. In some aspects, by way of example and not limitation, the remedial measure(s) may include the addition of new data sources or alerting rules, the activation of unused security tool features, or the replacement of existing security tool(s) for security tool(s) comprising a higher performance rating, as non-limiting examples, wherein the security assessment system may be configured to detect the implementation of such remedial measures. In some non-limiting exemplary implementations, the security assessment system may be configured to assess, calculate, or otherwise determine a mean time to detect one or more aspects of a security validation test as well as a mean time to respond to one or more generated notifications indicative of such detection. In some aspects, this may provide a quantified indication as to whether any detected problems or issues were addressed in a timely manner.

In some implementations, at 1130, at least one time lapse interval may be determined or calculated, such as, for example and not limitation, a time lapse interval between the initialization of the implemented security validation test and one or more of: the generation of the at least one notification indicating detection, the logging of one or more aspects of the security validation test, and/or the implementation of at least one remedial measure. In some implementations, the time interval(s) may be transmitted and presented to one or more users of the security assessment system. In some aspects, an excessive time lapse may be indicative of one or more deficiencies within the security infrastructure of the scoped computing environment.

In some aspects, at 1135, one or more security validation test results may be presented to at least one user of the security assessment system. In some non-limiting exemplary implementations, the security assessment system may generate one or more security validation test results in the form of one or more notifications upon a determination that one or more components or processes of the security infrastructure targeted by or exposed to the implemented security validation test failed to operate or function as required or expected. In some embodiments, the generated result notification(s) may be transmitted and presented to at least one user of the security assessment system. By way of example and not limitation, the security assessment system may generate at least one result notification upon a determination that the security infrastructure failed to detect and/or log at least a portion of the abnormal activity implemented by the security validation test or upon a determination that the security infrastructure failed to generate at least one notification of detected and/or logged abnormal activity, as non-limiting examples. In some non-limiting exemplary implementations, the result notification(s) may be generated and transmitted in substantially real time upon a determination that one or more components or processes of the security infrastructure failed.

Referring now to FIG. 12, an exemplary computing system that may be used to implement computing functionality 1200 for one or more aspects of a security assessment system, according to some embodiments of the present disclosure, is illustrated. In some aspects, in all cases computing functionality 1200 may represent one or more physical and tangible processing mechanisms. Computing functionality 1200 may comprise volatile and non-volatile memory, such as RAM 1202 and ROM 1204, as well as one or more processing devices 1206 (e.g., one or more central processing units (CPUs), one or more graphical processing units (GPUs), and the like). Computing functionality 1200 also optionally comprises various media devices 1208, such as a hard disk module, an optical disk module, and so forth. Computing functionality 1200 may perform various operations identified above when the processing device(s) 1206 execute(s) instructions that are maintained by memory (e.g., RAM 1202, ROM 1204, and the like).

More generally, instructions and other information may be stored on any computer readable medium 1210, including, but not limited to, static memory storage devices, magnetic storage devices, and optical storage devices. The term "computer readable medium" also encompasses plural storage devices. In all cases, computer readable medium 1210 represents some form of physical and tangible entity. By way of example and not limitation, computer readable medium 1210 may comprise "computer storage media" and "communications media."

"Computer storage media" comprises volatile and non-volatile, removable and non-removable media implemented in any method or technology for storage of information, such as computer readable instructions, data structures, program modules, or other data. Computer storage media may be, for example, and not limitation, RAM 1202, ROM 1204, EEPROM, Flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically comprise computer readable instructions, data structures, program modules, or other data in a modulated data signal, such as carrier wave or other transport mechanism. Communication media may also comprise any information delivery media. The term "modulated data signal" means a signal that has one or more of its characteristics set or changed in such a manner as to encode information in the signal. By way of example, and not limitation, communication media comprises wired media such as wired network or direct-wired connection, and wireless media such as acoustic, RF, infrared, and other wireless media. Combinations of any of the above are also included within the scope of computer readable medium.

Computing functionality 1200 may also comprise an input/output module 1212 for receiving various inputs (via input modules 1214), and for providing various outputs (via one or more output modules). One particular output module mechanism may be a presentation module 1216 and an associated GUI 1218. Computing functionality 1200 may also include one or more network interfaces 1220 for exchanging data with other devices via one or more communication conduits 1222. In some aspects, one or more communication buses 1224 communicatively couple the above-described components together.

Communication conduit(s) 1222 may be implemented in any manner (e.g., by a local area network, a wide area network (e.g., the Internet), and the like, or any combination thereof). Communication conduit(s) 1222 may include any combination of hardwired links, wireless links, routers, gateway functionality, name servers, and the like, governed by any protocol or combination of protocols.

Alternatively, or in addition, any of the functions described herein may be performed, at least in part, by one or more hardware logic components. For example, without limitation, illustrative types of hardware logic components that may be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

The terms "service," "module," and "component" as used herein generally represent software, firmware, hardware, or any combination thereof. In the case of a software implementation, the service, module, or component represents program code that performs specified tasks when executed on one or more processors. The program code may be stored in one or more computer readable memory devices. The features of the present disclosure described herein are platform-independent, meaning that the techniques can be implemented on a variety of commercial computing platforms having a variety of processors (e.g., desktop, laptop, notebook, tablet computer, personal digital assistant (PDA), mobile telephone, smart telephone, gaming console, and the like).

CONCLUSION

A number of embodiments of the present disclosure have been described. While this specification contains many specific implementation details, these should not be construed as limitations on the scope of any disclosures or of what may be claimed, but rather as descriptions of features specific to particular embodiments of the present disclosure.

Certain features that are described in this specification in the context of separate embodiments can also be implemented in combination or in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. A computer-implemented method for validating the performance of at least one security infrastructure within at least one scoped computing environment, the computer-implemented method comprising:
   integrating at least one security assessment system with the at least one scoped computing environment, wherein the at least one scoped environment comprises the at least one security infrastructure and at least one endpoint, wherein the at least one security infrastructure comprises at least one data source configured within the at least one endpoint, wherein the at least one endpoint comprises a target of at least one security validation test, wherein the at least one security validation test comprises an amount of abnormal activity within at least one portion of the scoped computing environment, wherein the amount of abnormal activity comprises at least one attack imported by the security assessment system from at least one third-party software sources or at least one database comprising stored attacks, wherein the at least one security assessment system receives at least one selection of a rule that comprises a selection of one or more security tools that will be tested by the at least one attack;
   initiating the at least one security validation test;
   determining one or more of: whether at least one portion of the at least one security validation test was detected by the at least one security infrastructure at the at least one endpoint; whether detection of the at least one portion of the at least one security validation test was recorded by the at least one security infrastructure, or whether the at least one security infrastructure generated at least one notification that the at least one portion of the at least one security validation test was detected by the at least one security infrastructure at the at least one endpoint;
   determining at least one time lapse interval initialization of the implemented security validation test and two or more of: the generation of the at least one notification indicating detection, the logging of one or more aspects of the security validation test, and/or the implementation of at least one remedial measure; and
   receiving the at least one notification by at least one user interface generated and presented via at least one computing device, wherein the at least one user interface indicates and displays one or more execution details for the at least one security validation test within the at least one scoped computing environment.

2. The computer-implemented method of claim 1, wherein the method further comprises:
   determining whether at least one remedial measure was implemented in response to generation and transmission of at least one notification that the at least one portion of the at least one security validation test was detected.

3. The computer-implemented method of claim 1, wherein the at least one security validation test is automatically initiated at one or more predetermined time intervals.

4. The computer-implemented method of claim 1, wherein the at least one security validation test is automatically initiated on a recurring basis.

5. The computer-implemented method of claim 1, wherein the at least one security validation test is initiated during an uptime of the scoped computing environment.

6. The computer-implemented method of claim 1, wherein the at least one security validation test is imported from at least one database.

7. The computer-implemented method of claim 6, wherein the at least one security validation test is imported from one or more third-party sources.

8. The computer-implemented method of claim 1, wherein the method further comprises:
   generating one or more security validation test results.

9. The computer-implemented method of claim 8, wherein the method further comprises:
   presenting the one or more security validation test results to at least one user.

10. The computer-implemented method of claim 9, wherein the one or more security validation test results are generated and presented in substantially real time upon a determination that the at least one portion of the at least one security validation test was not detected at the at least one endpoint or upon a determination that the at least one security infrastructure did not generate at least one notification that the at least one portion of the at least one security validation test was detected by the at least one security infrastructure at the at least one endpoint.

11. The computer-implemented method of claim 8, wherein the one or more security validation test results are generated upon a determination that the at least one portion of the at least one security validation test was not detected at the at least one endpoint.

12. The computer-implemented method of claim 8, wherein the one or more security validation test results are generated upon a determination that the at least one security infrastructure did not generate at least one notification that the at least one portion of the at least one security validation test was detected by the at least one security infrastructure at the at least one endpoint.

13. The computer-implemented method of claim 1, wherein the at least one security validation test comprises the amount of abnormal activity within the at least one endpoint.

14. The computer-implemented method of claim 1, wherein the at least one endpoint comprises a plurality of endpoints, wherein the plurality of endpoints comprises the target of the at least one security validation test.

15. A security assessment system, comprising:
  at least one scoped computing environment, wherein the at least one scoped computing environment comprises at least one endpoint and at least one security infrastructure, wherein the at least one security infrastructure comprises one or more data sources;
  at least one processing device; and
  at least one storage medium, wherein the at least one storage medium comprises one or more coded instructions configured to be accessed and executed by the at least one processing device to facilitate at least one security validation test within the scoped computing environment, wherein the at least one security validation test comprises an amount of abnormal activity within at least one portion of the scoped computing environment, wherein the amount of abnormal activity comprises at least one attack imported by the security assessment system from at least one third-party software sources or at least one database comprising stored attacks, wherein the at least one security assessment system receives at least one selection of a rule that comprises a selection of one or more security tools that will be tested by the at least one attack, and wherein execution of the one or more coded instructions by the at least one processing device enables the security assessment system to:
  initiate the at least one security validation test;
  determine whether at least one portion of the at least one security validation test was detected by the at least one security infrastructure at the at least one endpoint; and
  determine whether the at least one security infrastructure generated at least one notification that the at least one portion of the at least one security validation test was detected by the at least one security infrastructure at the at least one endpoint;
  determining at least one time lapse interval initialization of the implemented security validation test and two or more of: the generation of the at least one notification indicating detection, the logging of one or more aspects of the security validation test, and/or the implementation of at least one remedial measure;
  at least one user interface configured to receive the at least one notification and display it for at least one or more users via at least one computing device; and
  receiving the at least one notification by at least one user interface generated and presented via at least one computing device, wherein the at least one user interface indicates and displays one or more execution details for the at least one security validation test within the at least one scoped computing environment.

16. The security assessment system of claim 15, wherein the at least one security validation test comprises an amount of abnormal activity within the at least one endpoint.

17. The security assessment system of claim 16, wherein the at least one endpoint comprises the one or more data sources.

18. The security assessment system of claim 15, wherein the at least one security infrastructure further comprises one or more security tools, wherein each of the one or more security tools is configured to receive and analyze data transmitted from the one or more data sources.

* * * * *